United States Patent [19]

Crutchfield et al.

[11] 4,204,052
[45] May 20, 1980

[54] COPOLYMERS OF ACETAL CARBOXYLATES

[75] Inventors: Marvin M. Crutchfield, Creve Coeur; Victor D. Papanu, Maryland Heights, both of Mo.; Craig B. Warren, Rumson, N.J.

[73] Assignee: Monsanto Company, St. Louis, Mo.

[21] Appl. No.: 962,512

[22] Filed: Nov. 20, 1978

Related U.S. Application Data

[63] Continuation-in-part of Ser. No. 904,067, May 8, 1978, abandoned, which is a continuation-in-part of Ser. No. 826,424, Aug. 22, 1977, abandoned.

[51] Int. Cl.² .......................... C08G 2/14; C08G 2/30; C08L 59/02
[52] U.S. Cl. .................... 525/398; 252/89.1; 260/345.7 R; 260/345.8 R; 528/232; 528/239; 528/243; 528/270; 560/180; 560/182; 562/583; 525/509
[58] Field of Search .............. 528/231, 232, 239, 243, 528/270; 562/583; 560/180, 182; 260/345.7 R, 345.8 R

[56] References Cited

U.S. PATENT DOCUMENTS

| 3,704,320 | 11/1972 | Lannert | 252/546 |
| 3,706,672 | 12/1972 | Martin et al. | 252/156 |
| 3,725,290 | 4/1973 | Nelson et al. | 252/110 |
| 3,781,349 | 12/1973 | Ramsey et al. | 260/535 P |
| 3,970,698 | 7/1976 | Lannert | 260/535 P |
| 4,144,226 | 3/1979 | Crutchfield et al. | 528/231 |

Primary Examiner—Earl A. Nielsen
Attorney, Agent, or Firm—S. M. Tarter; E. P. Grattan; F. D. Shearin

[57] ABSTRACT

Copolymers of acetal carboxylates are provided which have the following empirical formula

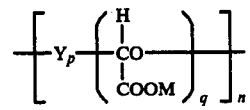

where Y is one or more comonomers randomly distributed in the copolymer; the product of n and q averages at least 4; p is at least 1; and M is selected from the group consisting of alkali metal, ammonium, alkyl groups having 1 to about 4 carbon atoms, and alkanol ammonium groups having 1 to about 4 carbon atoms in the alkyl chain. Such copolymers are useful as detergent builders to replace sodium tripolyphosphate (STP) in detergent formulations. The copolymers are stable under laundry use conditions, but depolymerize in acid media, making the fragments more readily biodegradable in waste streams.

33 Claims, No Drawings

COPOLYMERS OF ACETAL CARBOXYLATES

CROSS REFERENCE TO RELATED APPLICATIONS

This application is a continuation-in-part of application Ser. No. 904,067 filed May 8, 1978 and now abandoned, which is a continuation-in-part of application Ser. No. 826,424, filed Aug. 22, 1977 and now abandoned.

BACKGROUND OF THE INVENTION

This invention relates to novel polymeric acetal carboxylates useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STP) has been found to be a highly efficient cleaning and detergent builder and this compound has been widely used for decades in cleaning and detergent formulations. Indeed, millions of pounds of STP are used each year in cleansing formulations because of its superior builder qualities. However, because of the recent emphasis on removing phosphates from detergent and cleaning compositions for environmental reasons, the detergent and cleaning industry is now looking for materials suitable for use as builders which do not contain phosphorus, and which are environmentally acceptable.

A large number of materials which do not contain phosphorus have been evaluated for use in detergent and cleaning formulations as a builder, but all of these materials suffer one or more disadvantages, usually either poor builder properties or poor biodegradability. As an example, U.S. Pat. No. 3,692,685 discloses salts of oxydisuccinic acid and carboxy methyl oxysuccinic acid as detergent builders and U.S. Pat. No. 3,708,436 discloses a mixture of polymeric maleic anhydride with sodium nitrilotriacetate or STP. Numerous U.S. Patents, such as U.S. Pat. No. 3,704,320, disclose ether carboxylates as detergency builders and several references, such as U.S. Pat. No. 3,764,586 and U.S. Pat. No. 3,308,067, disclose polymeric, aliphatic polycarboxylic acids having certain specific structural relationships useful ad builders.

Despite the advances taught in these and other references in the prior art to find a cleaning and detergency builder which does not contain phosphorus, all of these materials suffer from one or more disadvantages. Of the above mentioned materials, those that are biodegradable are not equivalent to STP in builder performance, and of those that are equivalent to STP in builder performance, they are usually biodegradable only with great difficulty. Inorganic builders other than STP are generally not satisfactory for use as a builder in detergent formulations because of their poor builder properties. Sodium aluminum silicates, commonly known as zeolites, have been proposed for use in detergent formulations since they are able to soften water by removing calcium ions; however, they are not very effective in removing magnesium ions from water. Moreover, it is clear that such water-insoluble, clay-like materials have the potential problem of producing a sediment in the cleaning solution and the resulting waste waters.

Thus, it can be seen that there is a need for a new class of materials with builder properties equivalent to STP, which does not contain phosphorus, which is water-soluble, and which achieves environmental acceptability by being readily biodegradable. Now, according to the present invention, there is provided a new class of polymeric acetal carboxylates which are equal to, if not superior to, STP and which will depolymerize in a non-alkaline medium to form low molecular weight components which are readily biodegradable.

SUMMARY OF THE INVENTION

These and other advantages are achieved by a copolymer have the following general formula:

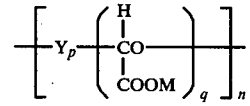

where Y is one or more comonomers randomly distributed in the copolymer, the product of q and n averages at least 4; p is at least 1; and M is selected from the group consisting of alkali metal, ammonium, alkyl groups having 1 to about 4 carbon atoms, and alkanol ammonium groups having 1 to about 4 carbon atoms in the alkyl chain.

Broadly described, the copolymer of the present invention can be prepared by: (A) bringing together under polymerization conditions an ester of glyoxylic acid aldehyde, one or more materials capable of polymerizing with the ester of glyoxylic acid aldehyde, and a polymerization initiator; and (B) stabilizing the resulting copolymer against rapid depolymerization in alkaline solution. To form a salt of the copolymer, the stabilized copolymer can be saponified. By this method, a copolymer is provided having the following general formula:

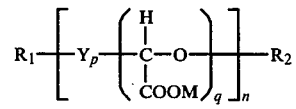

wherein Y is one or more comonomers; the product of q and n averages at least 4; p is at least 1; $R_1$ and $R_2$ are individually any chemically stable group which stabilize the copolymer against rapid depolymerization in alkaline solution; and M is selected from the group consisting of alkali metal, ammonium, alkyl groups having 1 to about 4 carbon atoms, and alkanol ammonium groups having from 1 to about 4 carbon atoms in the alkyl chain.

For the purposes of this invention, the term "rapid depolymerization in alkaline solution" as it is used in the specification and claims, shall mean that in an aqueous solution of 0.5 molar sodium hydroxide containing 10 grams per liter of the copolymer of the present invention, the average chain length of the copolymer will be reduced by more than 50 percent, as determined by Proton Magnetic Resonance, after 1 hour at 20° C.

Any number of esters of glyoxylic acid can be used as one starting material to prepare the copolymers of the present invention. Such esters can be made by the reaction of an alcohol containing from 1 to 4 carbon atoms with glyoxylic acid hydrate under conditions known to those skilled in the art. Suitable esters include those having from 1 to about 4 carbon atoms in the ester, such as methyl, ethyl, propyl, isopropyl, butyl, isobutyl and the like. Other esters of glyoxylic acid can also be used, provided that the particular ester does not interfere with the polymerization, cause the copolymer of the present invention to undergo rapid depolymerization in alkaline solution, or interfere with the intended function of the copolymer as a chelant, sequestrant or detergent builder, and such esters of glyoxylate are equivalent for purposes of this invention. Methyl and ethyl esters are preferred.

Thereafter, the resulting hemiacetal ester of glyoxylic acid can be converted to the corresponding aldehyde ester by any number of techniques known to those skilled in the art, such as the reaction of the ester with phosphorus pentoxide according to the following general equation:

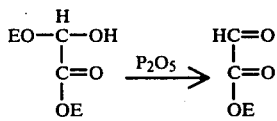

where E is an alkyl group having 1 to 4 carbon atoms. The resulting aldehyde ester is then polymerized with a suitable comonomer using a suitable initiator.

Any number of comonomers known to those skilled in the art can be polymerized with the aldehyde ester to form the copolymer of the present invention. It is only necessary that the comonomer has at least two reactive sites and does not inhibit polymerization or cause the copolymer of the present invention to depolymerize in alkaline solution. Suitable comonomers incude: epoxy compounds, such as ethylene oxide, proplyene oxide, epihalohydrin epoxysuccinate and the like; aldehydes such as formaldehyde, acetaldehyde, as well as aldehydes containing up to 20 carbon atoms, and the like. It is particularly beneficial when the comonomer contains substituent carboxy groups. Comonomers having from 1 to 4 carbon atoms, such as ethylene oxide, formaldehyde or acetaldehyde are preferred.

Mixtures of comonomers can be polymerized with the aldehyde ester to form a terpolymer, or even a more complex polymeric structure. For example, mixtures of the same class of comonomers, such as a mixture of epoxy compounds like ethylene oxide and propylene oxide, can be copolymerized with the aldehyde ester to form a terpolymer. Even comonomers that might inhibit polymerization when used alone can be mixed with a lower molecular weight aldehyde like formaldehyde or acetaldehyde and polymerized with the aldehyde ester to form a terpolymer wherein the comonomers are randomly dispersed along the polymeric chain. Numerous other examples will occur to those skilled in the art in view of the present disclosure, such as a mixture of ethylene oxide and formaldehyde.

Any number of initiators can be used for the polymerization. Nonionic or ionic initiators provide satisfactory results. Suitable initiators include: amines, such as triethyl amine, 2-hydroxy pyridine-$H_2O$ complex, and the like; strong Lewis acids, such as boron trifluoride or boron trifluoride diethyl etherate, phosphorus pentafluoride, stannic chloride and the like. Even traces of hydroxide or cyanide ion will trigger the polymerization. Sodio derivatives such as sodiomalonate or sodiomethylmalonate esters and the like have been used with good results.

As will occur to those skilled in the art in view of the present disclosure, the number of carboxylate groups in the copolymer of the present invention is important since the number of carboxylate groups affect the usefulness of the corresponding copolymer salt as a chelant, sequestrant, and detergent builder. Hence, the nature of the comonomer or comonomers (i.e., the nature of Y), the mole ratio of comonomer to aldehyde ester (i.e., the value of p and q) and the number of repeating units in the copolymer of the present invention (i.e., the average value of n) are each interrelated and important since they affect the number of carboxylate groups in the copolymer.

As noted above, the aldehyde ester can be polymerized with any number of comonomers, or even a mixture of comonomers, but as will occur to those skilled in the art, large comonomers or comonomers (or mixtures) that disperse the carboxylate groups along the copolymer chain too widely or inhibit chelation by steric hindrance of the carboxylate group, decrease the effectiveness of the corresponding copolymer salt as a sequestrant, chelant and builder. This decrease in effectiveness may be partially offset if the comonomer, or one of the comonomers, contains a carboxylate group. Hence, it is preferred to use a relatively small comonomer that does not disperse the carboxylate groups too widely or inhibit chelation by steric hindrance, such as ethylene oxide or formaldehyde.

The mole ratio of aldehyde ester to comonomer or comonomers (i.e., the value of q or p) is important. Although there is theoretically no upper limit to the moles of comonomer or comonomers to the moles of acetal carboxylate segments in the copolymer, when the mole ratio of comonomer to acetal carboxylate segments exceeds about 2:1 (i.e., p is up to about 2 and q is 1) the copolymer salt loses much of its effectivness as a chelant, sequestrant and detergent builder. It is preferred that the mole ratio of acetal carboxylate to comonomer is about 1:1 (i.e., p and q are each about 1) or higher, say 5:1 or even 99:1 (i.e., p is 1 and q times n is at least 5, say 100).

The number of repeating units, i.e., the average value of n, in the copolymer of the present invention is also important, since the effectiveness of the copolymer salt as a chelant, sequestrant and cleaning and detergency builder is affected by the average chain length. Even when the copolymer averages only four acetal carboxylate segments, the copolymer shows some effectiveness as a sequestrant, chelating agent and builder. Although there is no upper limit to the desired number of repeating units, which may average as high as 400, or even higher, (i.e., n equals 400 or higher) there does not seem to be an advantage to having a copolymer with an average of more than about 200 repeating units. When the average number of repeating units exceeds about 100, significant improvement in sequestration, chelation and builder properties is not observed. Thus, it is preferred that the copolymer of the present invention contain an average between about 10 and about 200 units, and even more preferred that the copolymer contains an average between about 10 and about 100 repeating units in the chain.

Some important factors believed to control the chain length of the copolymer include: (1) the initiator type and concentration, (2) the temperature of the polymerization, (3) the purity of the starting materials, and (4) the presence of solvents and their levels. As will occur to those skilled in the art, these factors are all interrelated and the desired chan length can easily be controlled by simple experimentation by controlling these variables. For example, when the polymerization is initiated using 2-hydroxy pyridine-$H_2O$ complex at a temperature of about $-70°$ C., the resulting copolymer has a greater chain length, determined by Proton Magnetic Resonance (PMR), than when the polymerization is initiated at about $20°$ C., using the same initiator, solvent and starting materials.

After the aldehyde ester has been polymerized with a comonomer as discussed above, any number of chemically reactive groups can be added to the copolymer termini, preferably using an ionic catalyst such as boron trifluoride etherate, trifluoroacetic acid, sulfuric acid, potassium carbonate, and the like. It is only necessary that the chemically reactive group stabilizes the copolymer against rapid depolymerization in an alkaline solution, and the specific nature of the chemically reactive group is not important in the proper function of the copolymer in its intended use. As an example, suitable chemically stable end groups include stable substituent moieites derived from otherwise stable compounds such as: alkanes, such as methane, ethane, propane, butane and higher alkanes such as decane, dodecane, octadecane and the like; alkenes such as ethylene, propylene, butylene, decene, dodecene and the like; branched chain hydrocarbons, both saturated and unsaturated, such as 2-methyl butane, 2-methyl butene, 4-butyl-2,3-dimethyl octane and the like; aromatic hydrocarbons such as benzene, toluene, xylene and the like; cycloalkanes such as cyclohexane and cyclohexene and the like; haloalkanes such as chloromethane, chlorobutane, dichloropentane and the like; alcohols such as methanol, ethanol, 2-propanol, cyclohexanol, alkyl phenol, and the like; polyhydric alcohols such as 1,2-ethane diol, 1,4-benzene diol and the like; mercaptans such as methane thiol, 1,2-ethanedithiol and the like; ethers such as methoxyethane methyl ether, ethyl ether, ethoxy propane and cyclic ethers such as ethylene oxide, epichlorohydrin, tetramethylene oxide and the like; and carboxylate-containing compounds such as the alkali metal salts of carboxylic acids, the esters of carboxylic acids and the anhydrides. The above listing is intended to be instructive and is not intended to be limited since other chemically stable end groups that stabilize the polymer against rapid depolymerization in an alkaline solution will occur to those skilled in the art in view of the present disclosure.

Particularly suitable end groups include alkyl groups, alkyl groups containing oxygen and cyclic alkyl groups containing oxygen: such as oxyalkyl groups like methoxy, ethoxy and the like; carboxylic acids such as

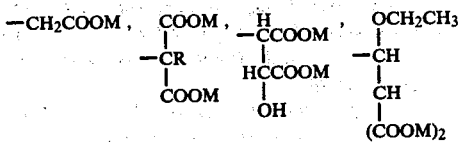

and the like; ethers and other oxygen-containing alkyl groups such as $-OCHCH_3OC_2H_5$, $+OCH_2CH_2)_1-_4OH$,

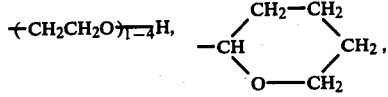

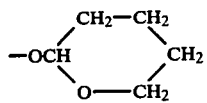

and the like. In the above examples of suitable end groups, M is alkali metal, ammonium, alkanol amine, alkyl group of 1 to 4 carbon atoms and R is hydrogen or alkyl group of 1 to 8 carbon atoms. As will occur to those skilled in the art in light of the present disclosure, the chemically stable end groups at the polymer termini can be alike or unlike.

In one embodiment of this invention, diethylsodiomalonate or sodiummethylmalonate is used as an initiator to form the copolymer. These compounds not only initiate the polymerization, but also the ester is incorporated as one of the chemically stable end groups to stabilize that end of the polymer against rapid hydrolysis in an alkaline solution. These sodio compounds can be prepared from the corresponding esters using sodium hydride in a solvent, such as tetrahydrofuran, by techniques known to those skilled in the art.

The stabilized copolymer ester is useful as an intermediate to prepare the corresponding alkali metal, ammonium or alkanol ammonium salts. It is only necessary to saponify the stabilized copolymer ester with a base, such as lithium hydroxide, sodium hydroxide, potassium hydroxide and the like, using conventional saponification techniques to make a salt suitable for use as a builder and as a sequestrant. The ammonium or alkanol ammonium salts can be prepared from the corresponding alkali metal salts using conventional ion exchange techniques.

The amount of copolymer salt required to effectively complex the ions in a given system will depend to some extent on the particular copolymer salt being used and the particular metal or alkaline earth metal ion in the aqueous media. Because the copolymer of the present invention tends to depolymerize in acid media, effective complexing is limited to neutral or preferably basic solution. Optimum conditions and amounts of the copolymer salt to be used can readily be determined by routine experimentation.

The copolymer salts of the present invention are also useful as builders in detergent formulations. Since the pH of a detergent solution is usually between pH 9 and pH 10, the copolymers of the present invention will not depolymerize rapidly when used as a detergent builder in aqueous solution at normal use concentrations (~250 ml./washer), temperatures (10°–60° C.) and times (i.e., about 15 minutes) typical of United States home laundry practices. Generally, the use of the alkali metal salts, particularly the sodium salt, is preferred. However, in some formulations where greater builder solubility is required, the use of ammonium or alkanol ammonium salts may be desirable.

The detergent formulations will contain at least 1 percent by weight and preferably at least 5 percent by weight of the copolymer salts of this invention. In order to obtain the maximum advantages of the copolymers of this invention as builders, the detergent should preferably contain from about 5 percent to about 75 percent of these salts. The copolymer salts of this invention can be the sole detergency builder, or the copolymer salts can be utilized in combination with other detergency builders which may constitute from 0 to 95 percent by weight of the total builders in the formulation. By way of example, builders which can be employed in combination with the copolymer salts of this invention include either water insoluble materials, such as sodium alumino silicates, commonly known as zeolites, or water soluble inorganic builder salts such as alkali metal polyphosphates, i.e., the tripolyphosphates and pyrophosphates, alkali metal carbonates, borates, bicarbonates and silicates and water soluble organic builders, including amino polycarboxylic acids and salts, such as alkali metal nitrilotriacetates, cycloalkane polycarboxylic acids and salts, ether polycarboxylates, alkyl polycarboxylates, epoxy polycarboxylates, tetrahydrofuran polycarboxylates, such as 1,2,3,4 or 2,2,5,5 tetrahydrofuran tetracarboxylates, benzene polycarboxylates, oxidized starches, amino tri(methylene phosphonic acid) salts, diphosphonic acid salts (e.g., the sodium salts of methylene diphosphonic acid or 1-hydroxy ethylidene 1,1-dimethylenephosphonic acid) and the like.

The detergent formulations will generally contain from 5 percent to 95 percent by weight total builder (although greater or lesser quantities may be employed if desired). The total amount of builder employed will be dependent on the intended use of the detergent formulation, other ingredients of the formulation, pH conditions and the like. For example, general laundry powder formulations will usually contain from about 20 percent to about 60 percent builder; and machine dishwashing formulations will usually contain from about 60 to about 90 percent builder. Optimum levels of builder content as well as optimum mixtures of copolymer salts of this invention with other builders for various uses can be determined by routine tests in accordance with conventional detergent formulation practice.

The detergent formulations will generally contain a water soluble detergent surfactant, although the surfactant ingredient may be omitted from machine dishwashing formulations. Any water soluble anionic, nonionic, zwitterionic or amphoteric surfactant can be employed.

Examples of suitable anionic surfactants include soaps such as the salts of fatty acids containing about 9 to 20 carbon atoms, e.g., salts of fatty acids derived from coconut oil and tallow; alkylbenzene sulfonates—particularly linear alkylbenzene sulfonates in which the alkyl group contains from 10 to 16 carbon atoms; alcohol sulfates; ethoxylated alcohol sulfates, hydroxy alkyl sulfonates; alkyl sulfates and sulfonates; monoglyceride sulfates, acid condensates of fatty acid chlorides with hydroxy alkyl sulfonates; and the like.

Examples of suitable nonionic surfactants include alkylene oxide (e.g., ethylene oxide), condensates of mono- and polyhydroxy alcohols, alkyl phenols, fatty acid amides, and fatty amines; amine oxides, sugar derivatives such as sucrose monopalmitate; long chain tertiary phosphine oxides; dialkyl sulfoxides; fatty acid amides (e.g., mono- or diethanol amides of fatty acids containing 10 to 18 carbon atoms); and the like.

Examples of suitable zwitterionic surfactants include derivatives of aliphatic quaternary ammonium compounds such as 3-(N,N-dimethyl-N-hexadecylammonio) propane-1-sulfonate and 3-(N,N-dimethyl-N-hexadecylammonio)-2-hydroxy propane-1-sulfonate.

Examples of suitable amphoteric surfactants include betains, sulfobetains and fatty acid imidazole carboxylates and sulfonates.

It will be understood that the above examples of surfactants are by no means comprehensive and that numerous other surfactants are known to those skilled in the art. It will be further understood that the choice and use of surfactants will be in accordance with well understood practices of detergent formulation. For example, anionic surfactants, particularly linear alkylbenzene sulfonates, are preferred for use in general laundry formulations, whereas low foaming nonionic surfactants are preferred for use in machine dishwashing formulations.

The quantity of surfactant employed in the detergent formulations will depend on the surfactant chosen and the end use of the formulation. In general, the formulations will contain from 5 percent to 50 percent surfactant by weight, although as much as 95 percent or more surfactant may be employed if desired. For example, general laundry powder formulations normally contain 5 percent to 50 percent, preferably 15 percent to 25 percent surfactant. Machine dishwashing formulations normally contain about 0.5 percent to about 5 percent surfactant. Liquid dishwashing formulations normally contain about 20 percent to about 45 percent surfactant. The weight ratio of surfactant to builder will generally be in the range of from 1:12 to 2:1.

In addition to builder and surfactant compositions, detergent formulations may contain fillers such as sodium sulfate and minor amounts of bleaches, dyes, optical brighteners, soil antiredeposition agents, perfumes and the like.

In machine dishwashing compositions, the surfactant will be a low foaming nonionic surfactant which will constitute 0 to 5 percent of the formulation.

It is to be noted that when the alkali metal, ammonium or alkanol ammonium salts of the present invention are used as builders, they will be used generally in an alkaline medium. When the copolymers of the present invention are used at a pH of 7 or below, the copolymer depolymerizes. Thus, the copolymers of the present invention when used as builders will be effective for chelating, sequestering and as detergency and cleaning builders, but when an aqueous solution containing the copolymer is discharged into a sewer or other waste water system, the copolymer will ultimately depolymerize into small fragments which are readily biodegradable.

DESCRIPTION OF THE PREFERRED EMBODIMENTS

This invention is illustrated by, but not limited to, the following Examples wherein all percentages are by weight unless otherwise noted.

EXAMPLE I

This Example illustrates the preparation of the anhydrous aldehyde ester useful to prepare the copolymers of the present invention.

To a 500 milliliter round-bottom flask equipped with an efficient stirrer and a heater is added 100 grams of methyl glyoxylate methyl hemiacetal and 160 grams of phosphorus pentoxide. The contents of the flask are heated to 100° C. with stirring for one hour and then allowed to cool to room temperature. The resulting aldehyde ester is recovered from the residual phosphorus pentoxide by distillation and stored in a glass stoppered bottle.

EXAMPLE II

To a 100 milliliter single-necked, round-bottomed reaction flask equipped with a magnetic stirrer is added 10 grams of freshly distilled aldehyde ester prepared in Example I and 4 milliliters of methylene chloride. The temperature of the flask and the contents are lowered to about 0° C., 5.3 grams of ethylene oxide and 0.5 milliliters boron trifluoride diethyl etherate are added to initiate polymerization. The flask is kept in an ice bath until the temperature returns to 0°–2° C., (about 45 minutes). The mixture is stirred at room temperature overnight. About 2 milliliters of 1 molar NaOH solution is added to the mixture and the volatiles are removed under vacuum. Then 12 milliliters of 2.5 molar NaOH are added. The mixture is stirred at about 0° C. for about 5 hours and then heated to about 40° C. for about 24 hours. The methanol and residual solvents are removed by rotary evaporation. The solution is concentrated to about 15 percent, precipitated in about 100 milliliters of methanol and stirred for 30 minutes. The precipitate is recovered by filtration and dried. The precipitate is then redissolved in distilled water, precipitated into methanol, stirred and recovered by filtration. The yield is about 74.8 percent. Analysis of the product, including the chain length, by Proton Magnetic Resonance (PMR) Spectra Analysis, shows that the product is a copolymer having the following empirical formula:

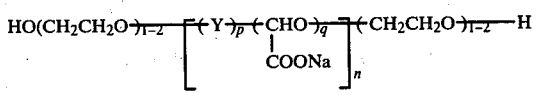

where n averages about 20, Y is —$CH_2CH_2O$— randomly distributed in the copolymer, and the ratio of p to q is about 1:3.

EXAMPLE III

The procedure of Example II is repeated except that about 5 mole percent ethylene oxide is mixed with about 95 mole percent aldehyde ester from Example I. The copolymer is analyzed by PMR, and the composition is the same as in Example II except that the ratio of comonomer to acetal carboxylate segments is about 1:25.

EXAMPLE IV

The general procedure of Example II is repeated except that about 4.4 grams of aldehyde ester from Example I is diluted with about 1.5 milliliters of methylene chloride, the temperature is reduced to about −10° C., and then about 1.2 mole percent boron trifluoride diethyl etherate is added to the methyl glyoxylate solution. After about 30 minutes, 0.01 mole ethylene oxide is added and allowed to react at about 22° C. for about 34 hours. The resulting stabilized copolymer is hydrolyzed using 2.5 molar NaOH as in Example II. Analysis by PMR showed that the yield was about 73 percent. The average mole ratio of acetal carboxylate segments to oxyethylene groups is about 8.4:1.

EXAMPLE V

A portion of the copolymer from Example IV is tested for sequestration function using the procedures described by Matzner et al ("Organic Builder Salts as Replacements for Sodium Tripolyphosphate", TENSIDE DETERGENTS, 10 No. 3, pages 119–125) 1973. The sequestration of calcium ions and magnesium ions (as a percent of STP performance) shows that the copolymer salt is about 77 percent of STP performance.

EXAMPLE VI

The biodegradation of a sample from Example IV is measured by diluting one part of an activated sewerage sludge with about 10 parts of river water, and adding a known amount of the copolymer to the diluted sludge. The biodegradation is determined by measuring the $CO_2$ evolution from the diluted sludge. The evolution of carbon dioxide is comparable to materials known to be biodegradable, since about 10 percent of the theoretical amount of carbon dioxide is evolved after four weeks.

EXAMPLE VII

The general procedure of Example II is repeated except that about 5 grams of aldehyde ester from Example I is diluted with about 1.5 milliliters of methylene chloride, the temperature is reduced to 0° C., and about 1 gram of a saturated aliphatic aldehyde having the empirical formula $C_{12}H_{25}CHO$ in 4 milliliters of methylene chloride is added to the aldehyde ester. Then, about 1.2 mole percent boron trifluoride-diethyl etherate is added. After the polymerization is completed, about 0.2 milliliters trifluoroacetic acid is added and 0.2 gram ethylene oxide is added and allowed to react at 20° C. for 24 hours. The resulting stabilized copolymer is hydrolyzed using 10 molar NaOH. The copolymer precipitates and is recovered by filtration. Analysis of the product by PMR showed that the average ratio of acetal carboxylate segments to —$C_{12}H_{25}CHO$— groups is about 6:1.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A copolymer having the following empirical formula:

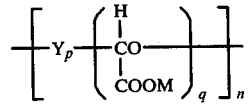

where Y is one or more comonomers randomly distributed in the copolymer; the product of q and n averages at least 4; p is at least 1; and M is selected from the group consisting of alkali metal, ammonium, alkyl groups having 1 to about 4 carbon atoms, and alkanol ammonium groups having 1 to about 4 carbon atoms in the alkyl chain.

2. A copolymer of claim 1 wherein n averages between about 10 and about 200.

3. A copolymer of claim 1 wherein n averages between about 10 and about 100.

4. A copolymer of claim 1 wherein p is up to about 2.

5. A copolymer of claim 1 wherein q and p are each about 1.

6. A copolymer of claim 1 wherein p is 1 and q is at least about 5.

7. A copolymer of claim 1 wherein Y is an organic moiety containing at least one oxygen atom.

8. A copolymer of claim 7 wherein Y contains from 1 to about 20 carbon atoms.

9. A copolymer of claim 7 wherein Y contains from 1 to about 4 carbon atoms.

10. A copolymer of claim 7 wherein Y is selected from the group consisting of

and mixtures thereof wherein $R_3$ is hydrogen or an alkyl containing from 1 to about 20 carbon atoms.

11. A copolymer of claim 7 wherein Y is selected from the group consisting of $-CH_2CH(CH_3)O-$; $-CH_2CH_2O-$; and mixtures thereof.

12. A copolymer of claim 11 wherein n averages between about 10 and about 100.

13. A copolymer having the following empirical formula:

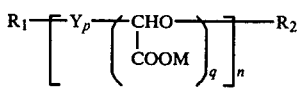

wherein Y is one or more comonomers randomly distributed in the copolymer; the product of q and n averages at least 4; p is at least 1; $R_1$ and $R_2$ are individually any chemically stable group which stabilize the polymer against rapid depolymerization in alkaline solution; and M is selected from the group consisting of alkali metal, ammonium, alkyl groups having 1 to about 4 carbon atoms, and alkanol ammonium groups having from 1 to about 4 carbon atoms in the alkyl chain.

14. A copolymer of claim 13 wherein n averages between about 10 and about 200.

15. A copolymer of claim 13 wherein n averages between about 10 and about 100.

16. A copolymer of claim 15 wherein p is up to about 2.

17. A copolymer of claim 15 wherein p and q are each about 1.

18. A copolymer of claim 15 wherein p is 1 and q is at least about 5.

19. A copolymer of claim 15 wherein $R_1$ and $R_2$ are individually selected from the group consisting of alkyl, alkyl groups containing oxygen and cyclic alkyl groups containing oxygen.

20. A copolymer of claim 17 wherein Y is selected from the group consisting of

$-CH_2CH_2O-$, $-CH_2CH(CH_3)O-$, and mixtures thereof, wherein $R_3$ is hydrogen or an alkyl containing 1 to about 20 carbon atoms.

21. A copolymer of claim 20 wherein $R_1$ is selected from the group consisting of $-OCH_3$, $-OC_2H_5$, $-OCHCH_3OC_2H_5$, $HO(CH_2CH_2O)_{\overline{4}}$,

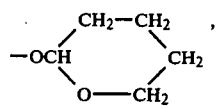

and mixtures thereof.

22. A copolymer of claim 20 wherein $R_2$ is selected from the group consisting of $-CH_3$, $-C_2H_5$, $-CHCH_3OC_2H_5$,

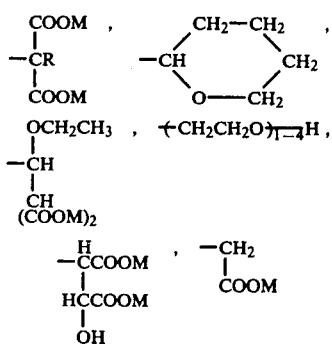

and mixtures thereof, and R is hydrogen or alkyl group of 1 to 8 carbon atoms.

23. A copolymer of claim 22 wherein M is sodium and Y is $-CH_2CH_2O-$.

24. A method which comprises
(a) bringing together under polymerization conditions an ester of glyoxylic acid aldehyde, at least one comonomer, and a polymerization initiator; and
(b) stabilizing the resulting copolymer against rapid depolymerization in alkaline solution.

25. A method of claim 24 wherein the comonomer is selected from the group consisting of epoxy compounds, aldehydes, compounds containing substituent carboxylate groups, and mixtures thereof.

26. A method of claim 25 wherein the comonomer is an aldehyde.

27. A method of claim 25 wherein the comonomer is an epoxy compound.

28. A method of claim 24 wherein the polymerization initiator is selected from the group consisting of amines, strong Lewis acids, hydroxy ion and cyanide ion.

29. A method of claim 24 wherein the copolymer is stabilized against rapid depolymerization in alkaline solution by adding to the copolymer termini a moiety selected from the group consisting of alkyl, alkyl groups containing oxygen and cyclic alkyl groups containing oxygen.

30. A method of claim 29 wherein the copolymer is stabilized by adding to the polymer termini moieties selected from the group consisting of —OCH₃, —OC₂H₅, —OCHCH₃OC₂H₅, HO(CH₂CH₂O)₁₋₄,

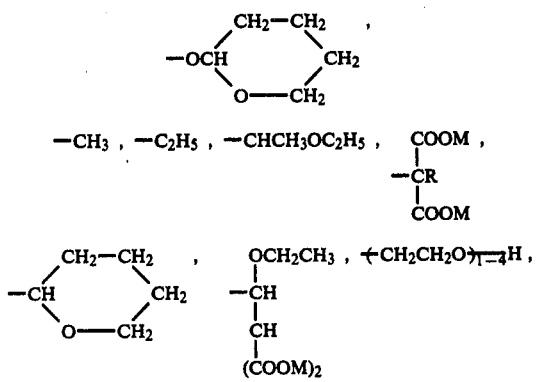

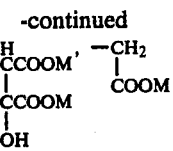

and mixtures thereof, wherein M is alkali metal, ammonium, alkanol ammonium and alkyl group containing 1 to 4 carbon atoms in the alkyl chain; and R is hydrogen or alkyl group of 1 to 8 carbon atoms.

31. A method of claim 29 wherein the stabilized copolymer ester is saponified to the corresponding copolymer selected from the group consisting of alkali metal, ammonium and alkanol ammonium salts.

32. A method of claim 31 wherein the stabilized copolymer ester is saponified to the alkali metal salt.

33. A method of claim 31 wherein the stabilized copolymer ester is saponified to the sodium salt.

* * * * *